Dec. 15, 1953 C. B. LIVERS 2,662,784
AUTOMATIC QUICK-DISCONNECT COUPLING MANUAL FLOW CONTROL
Filed May 21, 1951 2 Sheets-Sheet 1

INVENTOR.
C. B. Livers
BY
ATTORNEY

Dec. 15, 1953 — C. B. LIVERS — 2,662,784
AUTOMATIC QUICK-DISCONNECT COUPLING MANUAL FLOW CONTROL
Filed May 21, 1951 — 2 Sheets-Sheet 2

INVENTOR.
C. B. Livers
BY
ATTORNEY

Patented Dec. 15, 1953

2,662,784

UNITED STATES PATENT OFFICE 2,662,784

AUTOMATIC QUICK-DISCONNECT COUPLING MANUAL FLOW CONTROL

Carlos B. Livers, North Hollywood, Calif., assignor to Bendix Aviation Corporation, North Hollywood, Calif., a corporation of Delaware Application May 21, 1951, Serial No. 227,334

1 Claim. (Cl. 284—16)

This invention relates to quick disconnect hydraulic connections such as may be used between two connected vehicles and which automatically disconnect and close both ends of the disconnected line in response to separation of the vehicles.

An object of the invention is to provide an effective automatic disconnect coupling of inexpensive construction that is serviceable when exposed to dirt and dust.

Another object is to provide an automatic disconnect coupling with self closing valves which is of simple and serviceable design, and in which the valves can be manually closed or opened without disconnecting the coupling.

Still another object is to provide an automatic disconnect coupling with self-closing valves in which the closing of the valves is effected independently of and prior to separation of the coupling elements.

In accordance with the invention, serviceability in a dusty environment is effected by a design of the two coupling elements such that when they are separated all exposed surfaces are relatively smooth and devoid of dust collecting recesses, whereby they can be easily wiped clean prior to reconnection.

Automatic closing of the valves prior to separation of the coupling elements is provided for by locking the two coupling elements together with a toggle link latch mechanism actuated by a bail, and providing a valve-actuating mechanism controlled by the bail independently of the latch and actuated by the bail in advance of the actuation of the latch, whereby initial movement of the bail releases the valves into closed position before the latch mechanism holding the couplings together is released.

Manual control of the valves while the coupling is connected is effected by providing an adjustable element on the bail for coupling the latter to the valve actuating mechanism.

A full understanding of the invention may be had from the following detailed description with reference to the drawing in which.

Figure 1:
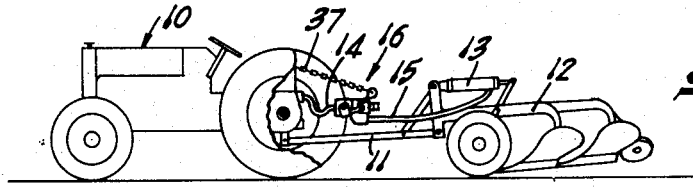
Fig. 1 is a side elevation of a tractor and a hydraulically controlled drawn implement connected by a hydraulic line incorporating an automatic disconnect coupling (shown greatly enlarged) in accordance with the invention.

Referring first to Fig. 1, there is shown a tractor 10 connected by a drawbar 11 to a plow 12 which has a raising and lowering mechanism actuated by a hydraulic motor cylinder 13. The cylinder 13 is actuated by pressure fluid transmitted from the tractor 10 through hose lines 14 and 15 on the tractor and plow, respectively, which are interconnected by a coupling 16 in accordance with the invention. This coupling 16 is of such design that it can be manually disconnected when desired, or, if the drawbar 11 is disconnected or disabled and the tractor 10 pulls away from the drawn implement 12, the coupling 16 will automatically break so as to avoid damage to the hose lines 14 and 15. When the coupling 16 is disconnected, the two parts thereof automatically close the ends of their respective hoses 14 and 15 to prevent escape of fluid.

Figure 2:
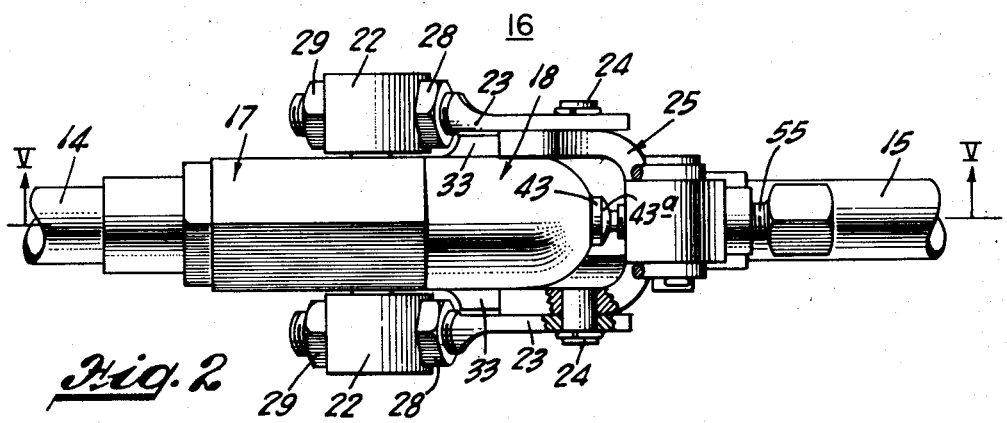
Fig. 2 is a plan view of the disconnect coupling.
Figure 3:
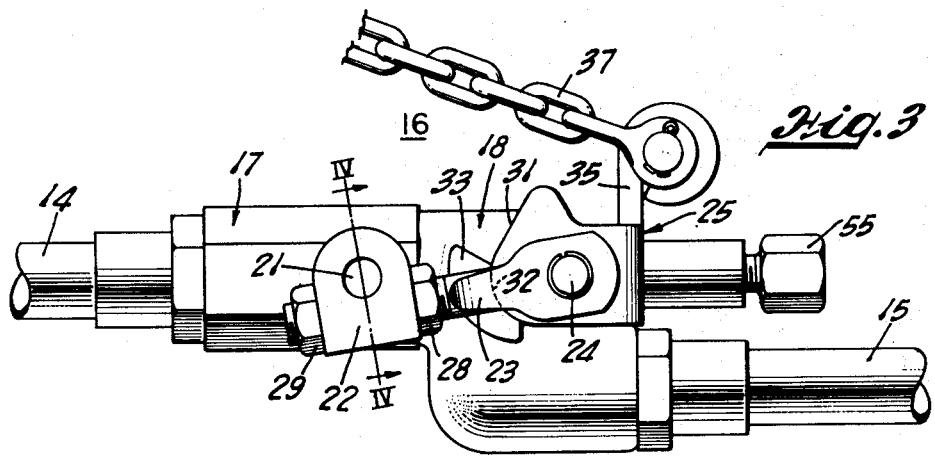
Fig. 3 is a side elevation of the coupling.

Referring to Figs. 2 and 3, the coupling 16 comprises a pair of coaxial, fluid-conducting members 17 and 18 respectively which are adapted to be secured to the ends of the hoses 14 and 15 respectively. The two members 17 and 18 have cooperating front abutting ends which, when the coupling is connected, are pressed together. A sealing ring 70 in the member 18 effects a fluid seal between the members when they are pressed together.

Figure 4:
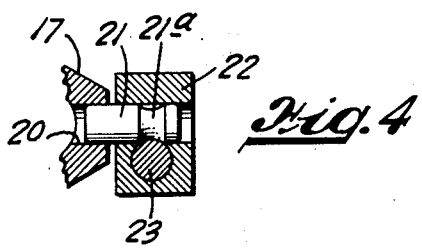
Fig. 4 is a detailed section in the plane IV—IV of Fig. 3.

The members 17 and 18 are held together by a link and yoke mechanism. Thus the member 17 has a pair of oppositely directed recesses 20 (Fig. 4) therein which receive the ends of a pair of trunnion pins 21, which are secured in a pair of hub members 22. Each hub member 22 is secured to the threaded end of a link 23, which threaded ends overlap the member 17; the other ends of the links 23 overlap and are hingedly connected by trunnions 24 to the ends of a yoke 25. The threaded portion of each link 23 extends through a hole provided therefor in its associated hub 22 and also engages an annular groove 21a in the trunnion pin 21 to lock the latter in the hub 22. The position of the link 23 is adjustable in the hub 22 by nuts 28 and 29 which are threaded thereon.

Figure 6:
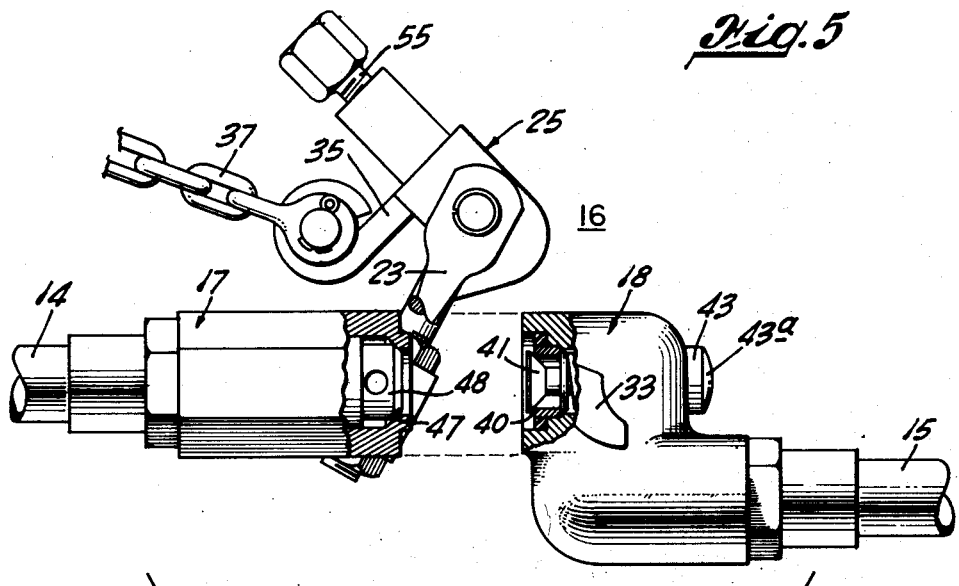
Fig. 6 is a side elevation similar to Fig. 3 but showing the coupling disconnected.

The ends of the yoke 25 are shaped to provide bearing surfaces 31 which engage cooperating bearing surfaces 32 on lugs 33 formed on opposite sides of the member 18. When the coupling is connected, as shown in Figs. 2 and 3, the yoke 25 straddles the member 18 in the axial plane of the lugs 33 and the trunnions 21 and 24 and the contacting portions of the bearing surfaces 31 and 32 all intersect the said axial plane, so that the separating force imposed on the members 17 and 18 by fluid pressure therewithin is taken directly, and there is no force couple tending to rotate the yoke 25 and thereby produce disconnection of the coupling. However, the yoke 25 is provided with a laterally extending arm 35 having an eye in its outer end for connection to a chain 37 or the like, which, as shown in Fig. 1, is connected to the tractor 10. In other words, the arm 35 is connected to the same object that the hose 14 is. Furthermore, the adjustment is such that there is less slack in the chain 37 than in the hose 14, so that if a strain is placed on the hose 15 tending to pull the coupling member 18 away from the coupling member 17, this force tightens the chain 37 and thereby applies a force couple to the yoke 25 tending to rotate the latter counterclockwise as seen in Fig. 3. The yoke will rotate in response to such a force couple, to cause the bearing surfaces 31 to disengage from the bearing surfaces 32 and permit the links 23 to rotate on the trunnions 21 simultaneously with rotation of the yoke 25 on the trunnions 24 so that the yoke and the links swing clear of the member 18, as shown in Fig. 6.

The coupling members 17 and 18 contain valves for closing off the ends of the couplings and preventing escape of fluid therefrom when they are disconnected from each other. Thus referring to Fig. 5, one coupling 18 has at its orifice a poppet valve seat 40 cooperating with a poppet valve 41 having a valve-actuating stem 42 which extends axially through the coupling and has a head portion 43 on its outer end which protrudes exterior of the member 18 opposite its front end. This head may have a sealing ring 44 to prevent leakage of fluid from the coupling and entry of foreign matter into the coupling. A helical compression spring 45 compressed between the rear end of the valve seat 40 and the head portion 43 constantly urges the valve 41 against its seat, that is, into closed position.

The diameter of the head portion 43 is larger than the effective diameter of the seat 40, so that internal fluid pressure urges the valve 41 against the seat 40. The seating force thus produced will increase proportionately as the fluid pressure is increased.

The other coupling member 17 has formed just within its orifice a valve seat 47 of larger diameter than the seat 40 and contains a poppet valve 48 which is urged against the seat 47 by a helical compression spring 49 which is compressed between the poppet 48 and a spring retaining ring 50 positioned in a groove in the member 17. The poppet 48 is hollow and has an enlarged rear skirt portion 48a which slides in the passage within the member 17 whereby the poppet is guided in its movement. Fluid flow past the valve 48 when the latter is open is provided for by lateral openings 48b in the poppet between the seat contacting portion and the skirt portion 48a.

Since the valve seat 47 is of larger diameter than the valve seat 40, the poppet 41 is able to enter the member 17 when it is opened, so that it can engage the poppet 48 and open the latter as well. Opening of both valves is effected by depressing the protruding head portion 43 of the stem 42.

Figure 5:
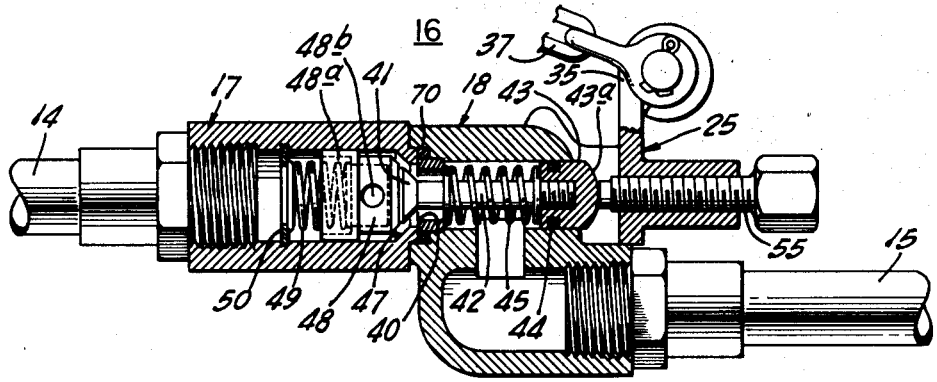
Fig. 5 is a longitudinal section taken in the plane V—V of Fig. 2.

This depression of the head portion 43 is produced by a valve actuating element 55 in the form of a screw threaded through the yoke 25 at the mid portion or bight thereof so that it is in alinement with the valve stem 42 when the coupling is connected, as shown in Fig. 5. It will readily be apparent that when the coupling is broken or disconnected as shown in Fig. 6, the head portion 43 of the valve stem is released by the screw element 55, thereby permitting the springs 45 and 49 to immediately move the valve stem 42 into an extended position and close the poppets 41 and 48 on their seats in the respective coupling members 17 and 18.

It is also possible to open and close the valves 41 and 48 without disconnecting the coupling, by turning the screw element 55. This is advantageous, since it is sometimes desired to prevent any flow between a tractor and a drawn implement, even though it is not desired to disconnect the line between the two devices.

When the coupling is to be manually disconnected, it is usually desirable to first release the valves by retracting the screw element 55 before swinging the yoke 25 into the disconnect position shown in Fig. 6, since this makes it easier to effect the movement of the yoke.

The outer end of the head 43 is convexly curved, as clearly shown at 43a in Figs. 2, 5 and 6. This makes it possible to connect the coupling while the screw element 55 is in valve opening position, since the tip of the element 55 initially contacts the rounded surface 43a of the head 43, and can thereafter slide therealong as the yoke moves into fully coupled position, depressing the head 43 as it does so.

Although it is usually desirable to provide a valve in each coupling member, as described, the invention is also applicable to a coupling having only the valve 41 in the member 18, the valve 48 in member 17 being omitted.

It will be observed from Fig. 6 that when the coupling is disconnected, the ends of both the coupling members 17 and 18 are separated from each other, and each coupling has relatively smooth surfaces, containing no deep recesses, so that the surfaces can be easily cleaned by wiping. This feature is very important in farm implements which are usually exposed to a great deal of dust and dirt. It is important, of course, to prevent entry of dust and dirt into the fluid passages of a hydraulic system.

It will be also observed that the coupling is of relatively simple construction and for that reason comparatively inexpensive to build.

Figure 7:
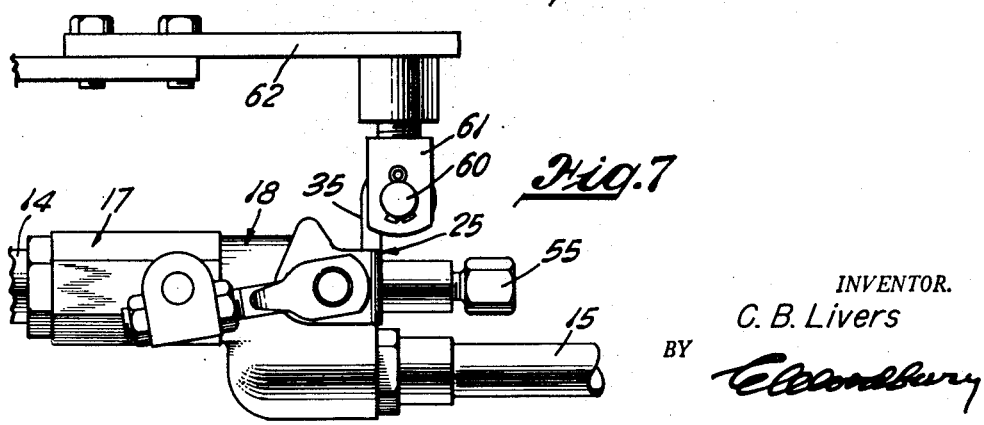
Fig. 7 is a side elevation showing an alternative method of mounting the coupling.

As shown in Figs. 1 and 3, the two hose elements have the coupling members 17 and 18 secured to their free ends, and the arm 35 on the yoke 25 is shown connected to the tractor 10 by the chain 37 for effecting automatic release in the event of strain on the hose 15. It is sometimes more convenient to secure the coupling member 17 directly to one of the vehicles, usually the tractor. In this case, the member 17 can be permanently secured to the tractor as shown in Fig. 7, in which the eye of the arm 35 is secured by a pin 60 to a clevis 61 which is secured to a bracket 62, secured to and extending rearwardly from the tractor. The coupling member 17 may still be connected to the hydraulic system of the tractor by a hose corresponding to the hose 14 in Fig. 1, but it is not necessary to provide as much slack in this hose as is shown in the hose 14 in Fig. 1. When a pull is exerted on the hose 15, the force couple produced between the hose 15 and the eye of the arm 35 disconnects the coupling as shown in Fig. 6 and the coupling member 17 is retained in position on the tractor, only the coupling member 18 on the end of the hose 15 being permitted to fall away.

Although, for the purpose of explaining the invention, a particular embodiment thereof has been shown and described, obvious modifications will occur to a person skilled in the art, and I do not desire to be limited to the exact details shown and described.

I claim:

A detachable coupling comprising: a pair of coaxial fluid conducting members having front abutting ends making fluid connection therebetween; one of said members having a valve therein and an axial valve actuating stem protruding from said one member opposite its front end and opening said valve in a depressed position and closing said valve in an extended position, and means urging said stem toward said extended position; said one member having a pair of diametrically opposite bearing lugs on its sides; a yoke straddling said one member in the axial plane of said lugs with its ends bearing against the lugs and its bight juxtaposed to said protruding stem, said bight comprising a valve actuating element bearing against and depressing said stem; a pair of connecting links extending from overlapping relation with said yoke legs to overlapping relation with the other of said members, and hinge means connecting the overlapping portions of said links to said yoke legs and to said other member respectively for swinging movement of said yoke out of said axial plane.

CARLOS B. LIVERS.

References Cited in the file of this patent

UNITED STATES PATENTS

| Number | Name | Date |
|---|---|---|
| 912,274 | Bastian | Feb. 16, 1909 |
| 1,593,772 | Litster | July 27, 1926 |
| 1,885,657 | Walker | Nov. 1, 1932 |
| 1,948,852 | Gilfoy | Feb. 27, 1934 |
| 1,993,167 | Harts | Mar. 5, 1935 |

FOREIGN PATENTS

| Number | Country | Date |
|---|---|---|
| 180,143 | Switzerland | Dec. 16, 1935 |